United States Patent
Pilutti et al.

(10) Patent No.: US 9,616,888 B2
(45) Date of Patent: Apr. 11, 2017

(54) VEHICLE SPEED ADJUSTMENT

(71) Applicant: Ford Global Technologies, LLC, Dearborn, MI (US)

(72) Inventors: Thomas Edward Pilutti, Ann Arbor, MI (US); Roger Arnold Trombley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 14/562,983

(22) Filed: Dec. 8, 2014

(65) Prior Publication Data

US 2016/0159350 A1  Jun. 9, 2016

(51) Int. Cl.
*B60W 30/14* (2006.01)

(52) U.S. Cl.
CPC ................. *B60W 30/143* (2013.01)

(58) Field of Classification Search
CPC .................................................. B60W 30/143
USPC .......................................... 701/23; 180/170
See application file for complete search history.

(56) References Cited

U.S. PATENT DOCUMENTS

| | | | |
|---|---|---|---|
| 3,796,871 A | 3/1974 | Helmcke et al. | |
| 6,304,811 B1 | 10/2001 | Prestl | |
| 7,124,027 B1 | 10/2006 | Ernst, Jr. et al. | |
| 7,711,485 B2 | 5/2010 | Matsumoto | |
| 8,788,134 B1 | 7/2014 | Litkouhi et al. | |
| 8,831,813 B1* | 9/2014 | Ferguson | B60T 8/32 701/23 |
| 8,948,995 B2* | 2/2015 | Pandita | B60W 30/17 180/168 |
| 2008/0125972 A1 | 5/2008 | Neff | |
| 2011/0190972 A1 | 8/2011 | Timmons et al. | |
| 2012/0123660 A1* | 5/2012 | Kagawa | B60W 30/16 701/96 |
| 2013/0184926 A1* | 7/2013 | Spero | B62D 1/28 701/26 |

OTHER PUBLICATIONS

Bailey, "Smart cruise control eliminates traffic jams" University of Michigan, http://www.ur.umich.edu/0304/July19_04/19.shtml (3 pages).
"Advanced drive skills", SGI Driver's Handbook—Highway driving, http://www.sgi.sk.ca/individuals/licensing/studyguides/drivershandbook/advancedskills/highwaydriving.html (3 pages).

* cited by examiner

*Primary Examiner* — Yazan Soofi
(74) *Attorney, Agent, or Firm* — Frank MacKenzie; Bejin Bieneman PLC

(57) ABSTRACT

A vehicle system includes a sensor that detects a speed of at least one nearby vehicle and outputs a speed signal representing the speed of the at least one nearby vehicle. The vehicle system further includes a processing device programmed to determine a set point speed based on the speed signal output by the sensor. The processing device generates a command signal to control a host vehicle in accordance with the set point speed.

20 Claims, 2 Drawing Sheets

VEHICLE SPEED ADJUSTMENT

BACKGROUND

Autonomous and partially autonomous vehicles assume certain driving-related tasks that would otherwise be handled by the vehicle driver. Such tasks can include maintaining vehicle speed, following a particular route, and keeping a certain distance from other vehicles. The autonomous vehicle may monitor the movement of the vehicle immediately in front of the autonomous vehicle, sometimes referred to as the "front vehicle", and the speed of the autonomous vehicle may be set to keep a particular distance from the front vehicle.

DETAILED DESCRIPTION

Setting the speed of the autonomous vehicle based on the speed of the front vehicle works in many situations. It is less effective, however, when the front vehicle is far ahead of the autonomous vehicle, when the front vehicle is exceeding the posted speed limit, or when the front vehicle is travelling well below the speeds of other nearby vehicles.

An alternative approach to setting autonomous vehicle speed includes monitoring the speed of nearby vehicles and setting the autonomous vehicle speed accordingly. An example vehicle system capable of setting speeds in such a manner includes a sensor that detects a speed of at least one nearby vehicle and outputs a speed signal representing the speed of the at least one nearby vehicle. The vehicle system further includes a processing device programmed to determine a set point speed based on the speed signal output by the sensor. The processing device generates a command signal to control a host vehicle in accordance with the set point speed. The processing device may be further programmed to limit the speed of the host vehicle in accordance with the posted speed limit.

With such a system, the autonomous host vehicle speed may be set according to the speed of the surrounding traffic and the posted speed limit. Moreover, the host vehicle can merge into lanes travelling at different speeds, as well as pass unusually slow vehicles. The elements shown may take many different forms and include multiple and/or alternate components and facilities. The example components illustrated are not intended to be limiting. Indeed, additional or alternative components and/or implementations may be used.

Figure 1:
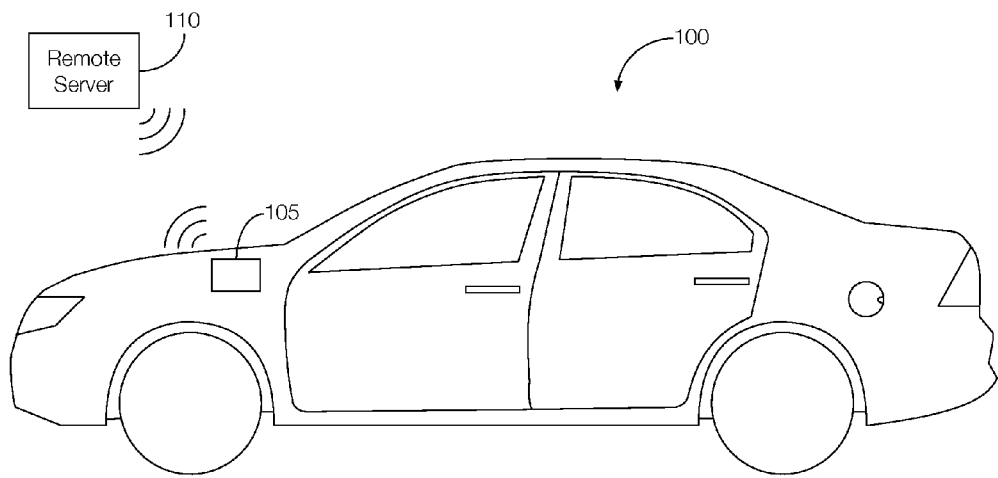
FIG. 1 illustrates an example vehicle with a system for adjusting a vehicle speed based on the speeds of nearby vehicles.

As illustrated in FIG. 1, a host vehicle 100 includes a system 105 that controls the speed of the host vehicle 100 according to the speeds of nearby vehicles. As discussed in greater detail below, the system 105 may detect the speeds of nearby vehicles and generate a speed signal. The speed signal may represent the speed of one nearby vehicle (e.g., a vehicle immediately in front of the host vehicle 100) or an average speed of multiple nearby vehicles. From the speed signal, the system 105 may determine a set point speed, representing the target operating speed of the host vehicle 100, and generate a command signal to control the host vehicle 100 in accordance with the set point speed. Accordingly, the speed of the host vehicle 100 may be based on the speed of traffic instead of a specific speed set by the driver (i.e., a cruise control speed) or set by a particular vehicle immediately in front of the host vehicle 100. Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the vehicle is an autonomous vehicle configured to operate in an autonomous (e.g., driverless) mode, a partially autonomous mode, and/or a non-autonomous mode.

In some instances, the host vehicle 100 may be in communication with a remote server 110. The remote server 110 may include a computing device that stores a speed database. The speed database may associate historical data to particular locations. The historical data may represent, e.g., the average or median speed of vehicles travelling through the location, the posted speed limit at the location, the real-time speeds of vehicles travelling through the location, or the like. As discussed in greater detail below, the system 105 may query the remote server 110, and in particular the historical data stored in the speed database, to generate the set point speed.

Figure 2:
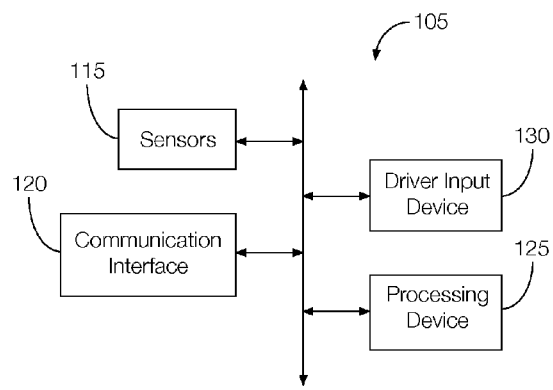
FIG. 2 is a block diagram of example components of the vehicle system incorporated into the vehicle of FIG. 1.

FIG. 2 is a block diagram of an example system 105 incorporated into the host vehicle 100 of FIG. 1. As shown, the system 105 includes at least one sensor 115, a communication interface 120, and a processing device 125.

The sensor 115 may be configured to detect a speed of at least one nearby vehicle. The sensor 115, therefore, may include a radar sensor, a lidar sensor, a vision sensor, or the like. The sensor 115 may be configured or programmed to determine the speed of the nearby vehicles by, e.g., calculating the velocity of each vehicle within a particular distance from the host vehicle 100. The sensor 115 may be further configured or programmed to output a speed signal representing the speed of one or more nearby vehicles. For instance, the speed signal may represent an average speed, a median speed, a second-highest speed, etc., of the nearby vehicles.

The communication interface 120 may be configured to facilitate wired or wireless communication between the components of the vehicle and other devices, such as the remote server 110 or even another vehicle when using, e.g., a vehicle-to-vehicle communication protocol. The communication interface 120 may be configured to receive messages from, and transmit messages to, a cellular provider's tower and the Service Delivery Network (SDN) associated with the vehicle that, in turn, establishes communication with a user's mobile device such as a cell phone, a tablet computer, a laptop computer, a fob, or any other electronic device configured for wireless communication via a secondary or the same cellular provider. Cellular communication to the telematics transceiver through the SDN may also be initiated from an internet connected device such as a PC, Laptop, Notebook, or WiFi connected phone. The communication interface 120 may also be configured to communicate directly from the vehicle to the user's remote device or any other device using any number of communication protocols such as Bluetooth®, Bluetooth® Low Energy, or WiFi. An example of a vehicle-to-vehicle communication protocol may include, e.g., the dedicated short range communication (DSRC) protocol. Accordingly, the communication interface 120 may be configured to receive messages from and/or transmit messages to the remote server 110 and/or other vehicles.

The processing device 125 may include any number of computing devices programmed to determine a set point speed, e.g., the target operating speed of the host vehicle 100, and generate a command signal to control the host vehicle 100 in accordance with the set point speed. The set point speed may be based on the speed signal, historical data stored in the speed database of the remote server 110, or both. For example, the processing device 125 may be programmed to determine the set point speed in accordance with the median speed of nearby vehicles, as detected by the sensor 115, and limited by the posted speed limit identified in the speed database. Alternatively, if no nearby vehicles are present, the processing device 125 may be programmed to generate the set point speed from the historical data stored in the speed database. Thus, through messages transmitted via the communication interface 120, the processing device 125 may be programmed to query the speed database. The response from the remote server 110 may be received by the processing device 125, again via the communication interface 120.

The processing device 125 may be programmed to generate the set point speed in accordance with a driver preference. For example, the driver may indicate his or her preference for the host vehicle 100 to travel at the median or average speed of nearby vehicles or the median or average speed of nearby vehicles relative to the speed limit (i.e., without exceeding the speed limit). Other preferences may include for the host vehicle 100 to travel at a speed lower than the speed of the fastest nearby vehicle or a speed lower than the speed of the fastest nearby vehicle relative to the speed limit (i.e., without exceeding the speed limit) or a reference speed (i.e., a maximum host vehicle 100 speed). The processing device 125 may be programmed to account for the posted speed limit when determining the set point speed relative to, e.g., the driver preference.

Moreover, the processing device 125 may be programmed to associate the speeds of one or more nearby vehicles to a particular lane. Example lanes may include adjacent lanes, non-adjacent lanes, and a same lane. Adjacent lanes may include lanes immediately to the left or right of the host vehicle 100. The same lane may include the lane in which the host vehicle 100 is travelling. Non-adjacent lanes may include all other lanes on the road that are not adjacent lanes or the same lane as the host vehicle 100. The processing device 125 may be further programmed to determine the set point speed based at least in part on whether the nearby vehicles are in the same lane, an adjacent lane, or a non-adjacent lane. For example, the speeds of vehicles in the same lane may be more relevant to the set point speed of the host vehicle 100 than the speeds of vehicles in adjacent and non-adjacent lanes. The speeds of adjacent lanes, and in some instances non-adjacent lanes, may become more relevant if, e.g., the host vehicle 100 attempts to change lanes. That is, the processing device 125 may use the set point speed to command the host vehicle 100 to accelerate or decelerate to match the speed of traffic in an adjacent lane during, e.g., a lane change.

Further, the processing device 125 may use the speeds of vehicles in adjacent lanes to determine whether to switch lanes. If the processing device 125 determines that a front vehicle (i.e., the vehicle immediately in front of the host vehicle 100) is travelling much slower than other vehicles and the speed limit, the processing device 125 may command the host vehicle 100 to pass the front vehicle. In this instance, passing the front vehicle may include commanding the host vehicle 100 to accelerate to match the speed of vehicles in one of the adjacent lanes and possibly commanding the host vehicle 100 to return to its original lane at a speed based on, e.g., the median speed, the second-fastest speed, the speed limit, or the like.

In another possible implementation, the processing device 125 may be programmed to determine the set point speed based on a driver intent signal output by a driver input device 130. An example driver input device 130 may include a turn signal. If the driver actuates the turn signal in a manner that suggests that the driver wishes for the host vehicle 100 to change lanes, the processing device 125 may receive the driver intent signal associated with an intent for the host vehicle 100 to change lanes and use the speeds of the vehicles in one of the adjacent lanes to calculate the new set point speed. The processing device 125 may command the host vehicle 100 to accelerate or decelerate in accordance with the set point speed.

Accordingly, the processing device 125 may control the host vehicle 100 to "blend in" with surrounding traffic—that is, travel at or about the same speed as nearby vehicles—or switch lanes when traffic in the lane of the host vehicle 100 is travelling significantly slower than that of the adjacent lanes. In instances where the host vehicle 100 is the fastest of the nearby vehicles, the processing device 125 may reduce the set point speed to command the host vehicle 100 to slow to the speed of nearby traffic or to a posted speed limit, which may be useful in instances where, e.g., the speed limit changes. Where no nearby vehicles are detected, the processing device 125 may set the set point speed based on, e.g., the posted speed limit, input from the driver, or the like.

Figure 3:
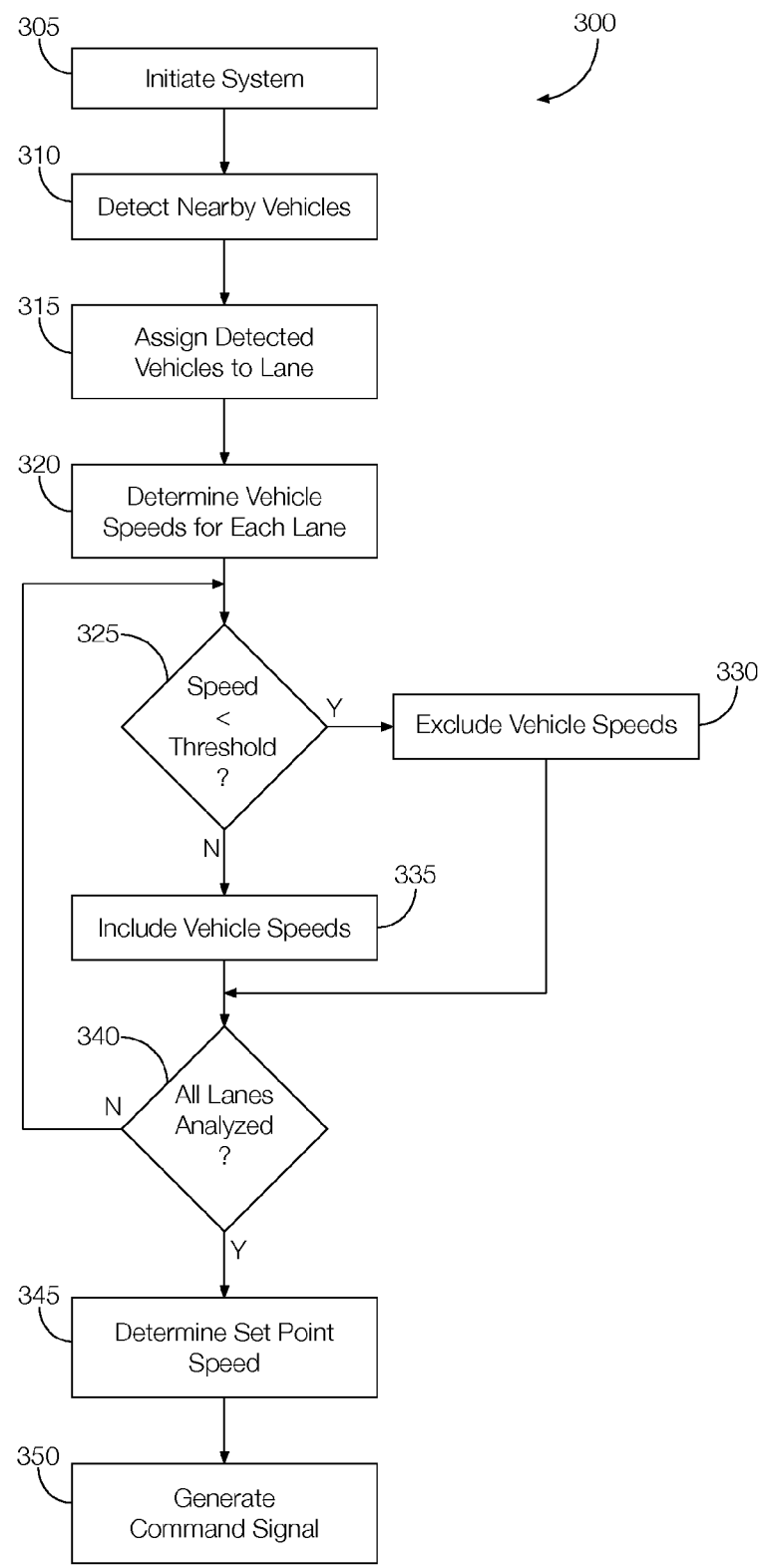
FIG. 3 is a flowchart of an example process that may be implemented by the vehicle system of FIG. 2.

FIG. 3 is a flowchart of an example process 300 that may be implemented by the system 105 to control the host vehicle 100 to operate at a speed based on the speeds of nearby vehicles.

At block 305, the system 105 may be initiated. The system 105 may run any time the host vehicle 100 is operating in an autonomous or partially autonomous mode.

At block 310, the sensors 115 may detect nearby vehicles. The nearby vehicles may include any vehicles in the same, adjacent, or non-adjacent lanes relative to the host vehicle 100. The sensors 115 may be configured to detect any number of nearby vehicles, and the number detected may be limited by the range of one or more sensors 115. In some instances, the sensors 115 may be programmed to only detect nearby vehicles within a particular range such as, e.g., a tenth of a mile from the host vehicle 100. Moreover, the sensors 115 may be programmed to detect only vehicles travelling in the same direction as the host vehicle 100 as nearby vehicles. The sensor 115 may be programmed or configured to output a speed signal for each vehicle detected. The speed signal may represent the speed of the detected nearby vehicle.

At block 315, the processing device 125 may assign each nearby vehicle detected at block 310 to a lane. The lane assignments may include the same lane as the host vehicle 100, an adjacent lane to the left of the host vehicle 100, an adjacent lane to the right of the host vehicle 100, a non-adjacent lane to the left of the host vehicle 100, a non-adjacent lane to the right of the host vehicle 100, and so on. In one possible approach, the processing device 125 may further assign detected vehicles to a "cross traffic" lane or an "opposing traffic" lane. The cross traffic and opposing traffic lane designations may be reserved for vehicles traveling in directions other than the direction of the host vehicle 100.

At block 320, the processing device 125 may determine the speed of the nearby vehicles in each lane. The processing device 125 may be programmed to determine the speeds of the nearby vehicles from the speed signals received from the sensor 115.

At decision block 325, the processing device 125 may determine, for each lane, whether the speeds of the nearby vehicles in each lane exceed a predetermined threshold. If the speeds of the nearby vehicles in a particular lane are below the predetermined threshold, the process 300 may continue at block 330 for the vehicles in that lane. If the speeds of the nearby vehicles in a particular lane exceed the predetermined threshold, the process 300 may continue at block 335 for the vehicles in that lane.

At block 330, the processing device 125 may select to exclude vehicle speeds from the lane being analyzed from the set point speed determination. The process 300 may continue at block 340 once such vehicle speeds have been designated for exclusion.

At block 335, the processing device 125 may select to include vehicle speeds from the lane being analyzed in the set point speed determination. The process 300 may continue at block 340 one such vehicle speeds have been designated for inclusion.

At decision block 340, the processing device 125 may determine whether all relevant lanes have been analyzed. This may include determining whether the processing device 125 has considered the speeds of nearby vehicles in the same lane as the host vehicle 100, in any adjacent lanes, and in any non-adjacent lanes. The processing device 125 may not consider vehicles travelling in cross traffic or opposing traffic lanes since the speeds of nearby vehicles in such lanes may not be relevant to the set point speed. If all relevant lanes have been considered, the process 300 may continue at block 345. If at least one relevant lane remains to be analyzed, the process 300 may return to block 325 so that the speeds of vehicles in additional lanes can be considered.

At block 345, the processing device 125 may determine the set point speed. The set point speed may be based on the speeds of nearby vehicles travelling in one or more of the relevant lanes. Moreover, determining the set point speed may include considering driver preferences. The driver preferences may include a preference for the host vehicle 100 to travel at the median or average speed of nearby vehicles in one or more relevant lanes or the median or average speed of nearby vehicles relative to the speed limit (i.e., without exceeding the speed limit). Other preferences may include for the host vehicle 100 to travel at a speed lower than the speed of the fastest nearby vehicle or a speed lower than the speed of the fastest nearby vehicle relative to the speed limit (i.e., without exceeding the speed limit) or a reference speed (i.e., a maximum host vehicle 100 speed). The processing device 125 may be programmed to account for the posted speed limit when determining the set point speed relative to, e.g., the driver preference. Alternatively or in addition, the processing device 125 may determine the set point speed based on historical data stored in a speed database. As discussed above, the speed database may associate historical data to particular locations, and the historical data may represent, e.g., the average or median speed of vehicles travelling through the location, the posted speed limit at the location, the real-time speeds of vehicles travelling through the location, or the like. In some instances, the processing device 125 may access the historical data stored in the speed database by querying the remote server 110. Further, the set point speed may be based on a driver intent signal indicating, e.g., the driver's intent for the host vehicle 100 to change lanes. In such instances, the speeds of one of the adjacent lanes may become more relevant than if no driver intent signal is received.

At block 350, the processing device 125 may generate a command signal. The command signal may command the host vehicle 100 to operate in accordance with the set point speed determined at block 345. After the command signal has been generated, the process 300 may return to block 310 so that the set point speed may be adjusted as the speeds of the nearby vehicles changes or new vehicles enter the vicinity of the host vehicle 100.

The process 300 may end when the host vehicle 100 is no longer operating in an autonomous or partially autonomous mode, or when the host vehicle 100 is turned off.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a sensor configured to detect a speed of a first nearby vehicle in a lane and a second nearby vehicle and output speed signals representing the speeds of the first nearby vehicle and the second nearby vehicle; and
a processing device programmed to assign at least one of the speed signals to the lane of the first nearby vehicle, determine a set point speed based on at least one of the speed signals output by the sensor, and generate a command signal to control a host vehicle in accordance with the set point speed,
wherein the processor is programmed to compare the speeds of the first nearby vehicle and the second nearby vehicle to a predetermined threshold and wherein the set point speed is determined from the speed of the first nearby vehicle if the speed of the first nearby vehicle does not exceed the predetermined threshold and wherein the processor is programmed to exclude the speed of the second nearby vehicle from the set point speed if the speed of the second nearby vehicle exceeds the predetermined threshold,
wherein the processing device controls a host vehicle in accordance with the set point speed.

2. The vehicle system of claim 1, wherein the set point speed is lower than the speed of the first nearby vehicle.

3. The vehicle system of claim 1, wherein the set point speed is based on a median speed of a plurality of nearby vehicles including the first nearby vehicle and a third nearby vehicle.

4. The vehicle system of claim 1, wherein the set point speed is based on historical data stored in a speed database.

5. The vehicle system of claim 4, further comprising a communication interface configured to wirelessly communicate with a remote server.

6. The vehicle system of claim 5, wherein the speed database is stored in the remote server.

7. The vehicle system of claim 5, wherein the processing device is programmed to query the remote server for the historical data.

8. The vehicle system of claim 1, wherein the lane of the first nearby vehicle includes at least one of an adjacent lane, a non-adjacent lane, and a same lane relative to the host vehicle.

9. The vehicle system of claim 1, wherein the processing device is programmed to determine the set point speed based at least in part on whether the lane associated with the first nearby vehicle is an adjacent lane, a non-adjacent lane, and a same lane.

10. The vehicle system of claim 1, further comprising a driver input device configured to output a driver intent signal.

11. The vehicle system of claim 10, wherein the processing device is programmed to determine the set point speed based at least in part on the driver intent signal.

12. A method comprising:
detecting, via a sensor, a speed of a first nearby vehicle and a second nearby vehicle;

outputting speed signals representing the speeds of the first nearby vehicle and the second nearby vehicle;

assigning at least one of the speed signals to a lane of the first nearby vehicle;

comparing the speeds of the first nearby vehicle and the second nearby vehicle to a predetermined threshold;

determining a set point speed from the speed of the first nearby vehicle if the speed of the first nearby vehicle does not exceed the predetermined threshold, wherein the set point speed excludes the speed of the second nearby vehicle if the speed of the second nearby vehicle exceeds the predetermined threshold; and controlling a host vehicle in accordance with the set point speed.

13. The method of claim 12, wherein the set point speed is lower than the speed of the first nearby vehicle.

14. The method of claim 12, wherein the set point speed is based on a median speed of a plurality of nearby vehicles including the first nearby vehicle and a third nearby vehicle.

15. The method of claim 12, wherein the set point speed is based on historical data stored in a speed database.

16. The method of claim 15, wherein determining the set point speed includes querying the remote server for the historical data.

17. The method of claim 12, further comprising determining the lane of the first nearby vehicle, the lane including at least one of an adjacent lane, a non-adjacent lane, and a same lane relative to the host vehicle.

18. The method of claim 12, wherein the set point speed is based at least in part on whether the lane associated with the first nearby vehicle is an adjacent lane, a non-adjacent lane, and a same lane.

19. The method of claim 12, further comprising receiving a driver intent signal.

20. The method of claim 19, wherein the set point speed is based at least in part on the driver intent signal.

* * * * *